US012340653B2

(12) United States Patent
Helgesen et al.

(10) Patent No.: US 12,340,653 B2
(45) Date of Patent: *Jun. 24, 2025

(54) SYSTEMS AND METHODS FOR LOCATING NETWORKED GAMING DEVICES

(71) Applicant: LNW Gaming, Inc., Las Vegas, NV (US)

(72) Inventors: James Helgesen, Eden Prairie, MN (US); Christine Bordeaux, Henderson, NV (US); Brent Larson, Vancouver, WA (US); Jonathan More, Lake Oswego, OR (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,690

(22) Filed: Jan. 23, 2024

(65) Prior Publication Data

US 2024/0161570 A1 May 16, 2024

Related U.S. Application Data

(60) Division of application No. 17/836,159, filed on Jun. 9, 2022, now Pat. No. 11,915,546, which is a continuation of application No. 17/119,722, filed on Dec. 11, 2020, now Pat. No. 11,386,745.

(51) Int. Cl.
*G07F 17/32* (2006.01)
*H04W 4/02* (2018.01)
*H04W 4/029* (2018.01)

(52) U.S. Cl.
CPC ...... *G07F 17/3218* (2013.01); *G07F 17/3223* (2013.01); *G07F 17/3241* (2013.01); *H04W 4/023* (2013.01); *H04W 4/029* (2018.02)

(58) Field of Classification Search
CPC .............. G07F 17/3218; G07F 17/322; G07F 17/3223; G07F 17/3241
See application file for complete search history.

(56) References Cited

U.S. PATENT DOCUMENTS

| | | | |
|---|---|---|---|
| 6,843,725 B2 * | 1/2005 | Nelson | G07F 17/3223 463/40 |
| 6,935,958 B2 * | 8/2005 | Nelson | G07F 17/3202 463/31 |
| 8,337,296 B2 | 12/2012 | Grauzer et al. | |
| 8,392,506 B2 | 3/2013 | Rowe et al. | |

(Continued)

*Primary Examiner* — Chase E Leichliter

(57) ABSTRACT

A system includes a plurality of stationary gaming tables positioned at a plurality of respective locations, a moveable table game device, one or more processors, and a server. Each gaming table includes a table transceiver. The table game device includes a device transceiver that receives data signals including identification data from the table transceivers via a first communication network. The processors determine an identity of the gaming tables based on the identification data, calculate a relative distance between the table game device and each gaming table based on at least one characteristic of a respective data signal, and generate location data indicating a relative location of the gaming device as a function of the calculated relative distances. The server collects the location data via a second communication network and stores the location data for analysis and location tracking.

14 Claims, 6 Drawing Sheets

(56) References Cited

U.S. PATENT DOCUMENTS

| | | | |
|---|---|---|---|
| 8,616,552 B2 | 12/2013 | Czyzewski et al. | |
| 8,919,775 B2 | 12/2014 | Wadds et al. | |
| 9,165,420 B1* | 10/2015 | Knust | G07F 17/3232 |
| 9,174,114 B1* | 11/2015 | Knust | G07F 17/3239 |
| 9,320,964 B2 | 4/2016 | Wadds et al. | |
| 9,345,951 B2 | 5/2016 | Czyzewski et al. | |
| 9,387,390 B2 | 7/2016 | Downs, III et al. | |
| 9,626,826 B2* | 4/2017 | Nguyen | G07F 17/323 |
| 9,666,021 B2* | 5/2017 | Nguyen | G07F 17/3223 |
| 9,908,034 B2 | 3/2018 | Downs et al. | |
| 10,086,260 B2 | 10/2018 | Grauzer et al. | |
| 10,286,291 B2 | 5/2019 | Wadds et al. | |
| 10,339,765 B2 | 7/2019 | Nagaragatta et al. | |
| 10,343,054 B2 | 7/2019 | Czyzewski et al. | |
| 10,576,363 B2 | 3/2020 | Downs, III et al. | |
| 11,386,745 B2* | 7/2022 | Helgesen | G07F 17/3218 |
| 11,915,546 B2* | 2/2024 | Helgesen | H04W 4/029 |
| 2002/0152120 A1* | 10/2002 | Howington | G06Q 30/0224 |
| | | | 902/23 |
| 2003/0130039 A1* | 7/2003 | Nelson | G07F 17/3223 |
| | | | 463/16 |
| 2003/0148809 A1* | 8/2003 | Nelson | G07F 17/3234 |
| | | | 463/29 |
| 2004/0219982 A1* | 11/2004 | Khoo | G07F 17/32 |
| | | | 463/42 |
| 2007/0099697 A1* | 5/2007 | Nelson | G07F 17/3202 |
| | | | 463/29 |
| 2007/0155489 A1* | 7/2007 | Beckley | G07F 17/3237 |
| | | | 463/29 |
| 2008/0051198 A1* | 2/2008 | Nelson | G07F 17/3223 |
| | | | 463/40 |
| 2009/0098925 A1* | 4/2009 | Gagner | G07F 17/32 |
| | | | 463/20 |
| 2011/0309577 A1* | 12/2011 | Vicens | G07F 17/3239 |
| | | | 273/148 R |
| 2014/0274319 A1* | 9/2014 | Nguyen | G07F 17/3225 |
| | | | 463/25 |
| 2014/0274320 A1* | 9/2014 | Nguyen | G07F 17/3239 |
| | | | 463/25 |
| 2017/0084106 A1* | 3/2017 | Borissov | G07F 17/3206 |
| 2017/0206734 A1* | 7/2017 | Nguyen | G07F 17/3241 |
| 2020/0175805 A1* | 6/2020 | Nagata | G07F 17/322 |
| 2022/0148375 A1* | 5/2022 | Haishima | A63F 9/00 |
| 2022/0156729 A1* | 5/2022 | Haishima | A63F 9/00 |
| 2022/0189241 A1* | 6/2022 | Helgesen | G07F 17/3218 |
| 2022/0301392 A1* | 9/2022 | Helgesen | G07F 17/3218 |
| 2024/0161570 A1* | 5/2024 | Helgesen | G07F 17/3241 |

* cited by examiner

SYSTEMS AND METHODS FOR LOCATING NETWORKED GAMING DEVICES

CROSS-REFERENCE TO RELATED APPLICATIONS

This application is a divisional of U.S. patent application Ser. No. 17/836,159, filed Jun. 9, 2022, which is a continuation of U.S. patent application Ser. No. 17/119,722, filed Dec. 11, 2020, both the contents of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020, SG Gaming, Inc.

TECHNICAL FIELD

This disclosure relates generally to networked gaming systems and, more specifically, to networked gaming devices that are locatable within a gaming environment based on communication signals.

BACKGROUND

Gaming devices used in the gaming industry, such as electronic gaming machines (EGMs), card-handling devices, and the like, are used for increasing the efficiency, security and game speed in games such as blackjack, baccarat, poker, and reel-based games, The gaming devices are deployed in a gaming environment (e.g., a casino). At least some gaming devices generate and/or collect data associated with gameplay, device diagnostics, and/or the like. The gaming devices may be communicatively coupled to a network to store and analyze the data from the gaming devices using a centralized data processing system. However, in at least some known networked gaming devices systems, the data collected may be hindered due to processing, memory, and/or networking limitations present in at least some gaming environments. For example, wireless networking in a gaming environment may be limited as a result of congestion in populated wireless bands (e.g., 2.4 GHz).

Moreover, these gaming devices may be moveable to facilitate selective deployment within one or more gaming environments. That is, the gaming devices can be deployed at various locations to fit the configuration of the gaming environments and/or can be removed from the gaming environments for maintenance and storage. As a result, tracking the location of the gaming devices may be desirable to effectively monitor maintenance schedules, usage of the gaming devices (e.g., for billing purposes), and/or gaming environment configurations. However, the processing, memory, and/or networking limitations of the gaming environments may hinder or otherwise prevent accurate and updated location tracking without manual intervention.

SUMMARY

Embodiments include a system for monitoring the location of moveable table game devices used in connection with stationary gaming tables in a gaming environment. The system includes a plurality of stationary gaming tables positioned at a plurality of respective locations, a moveable table game device equipped with a device transceiver and associated memory, one or more processors, a communication node, a server with associated memory that is communicatively coupled to the communication node. Each gaming table is equipped with a table transceiver and associated memory. Each table transceiver is in communication with a first communication network and a second communication network different from the first communication network. The device transceiver transmits and receives data signals including identification data via the first communication network with table transceivers of the stationary gaming tables. The processors, individually or in combination, determine an identity of each stationary gaming table based on the identification data extracted from the data signals received by the device transceiver, calculate a relative distance between the moveable table game device and each gaming table based on at least one characteristic of a respective data signal received or transmitted by the respective table transceiver, and generate location data associated with the moveable table game device at least partially as a function of the calculated relative distances and the respective locations of the gaming tables. The communication node is in communication with the second communication network to collect the generated distance data from at least one of the table transceivers. The server receives and stores the collected location data from the communication node.

Embodiments further include a method for monitoring the location of moveable table game devices used in connection with stationary gaming tables in a gaming environment. The method includes receiving, by a device transceiver of a moveable table game device, data signals including identification data via a first communication network from a plurality of respective table transceivers of a plurality of stationary gaming tables, determining, by one or more processors, an identity of each gaming table based on the identification data extracted from the data signal received from the respective table transceiver, calculating, by the one or more processors, a relative distance between the moveable table game device and each gaming table based on at least one characteristic of the respective data signal received from the respective table transceiver, generating, by the one or more processors, location data indicating a relative location of the moveable table game device at least partially as a function of the calculated relative distances associated with the moveable table game device and the stationary gaming tables, and transmitting, by at least one of the table transceivers, the location data to a communication node over a second communication network different from the first communication network. The communication node is communicatively coupled to a server that stores the location data and predetermined locations of the stationary gaming tables.

Embodiments also include a moveable game device located in a gaming environment for play of one or more wagering games. The moveable game device includes a device transceiver having an associated memory and a communication interface to communicate with a plurality of table transceivers via a first communication network, and at least one processor in communication with the table transceivers and the associated memory. Each table transceiver is associated with a stationary gaming table. The processors receive, via the communication interface, a respective data signal from each table transceiver, extract identification data from the respective data signals to identify the associated stationary gaming tables, calculate a relative distance between the moveable game device and each stationary gaming table based on at least one characteristic of the respective data signal, generate location data indicating a relative location of the moveable game device at least partially as a function of the calculated relative distances between the moveable game device and the stationary gaming tables, and transmit the location data to at least one stationary gaming table. The stationary gaming tables then transmit the location data to a server via a second communication network different from the first communication network for storage.

Figure 1:
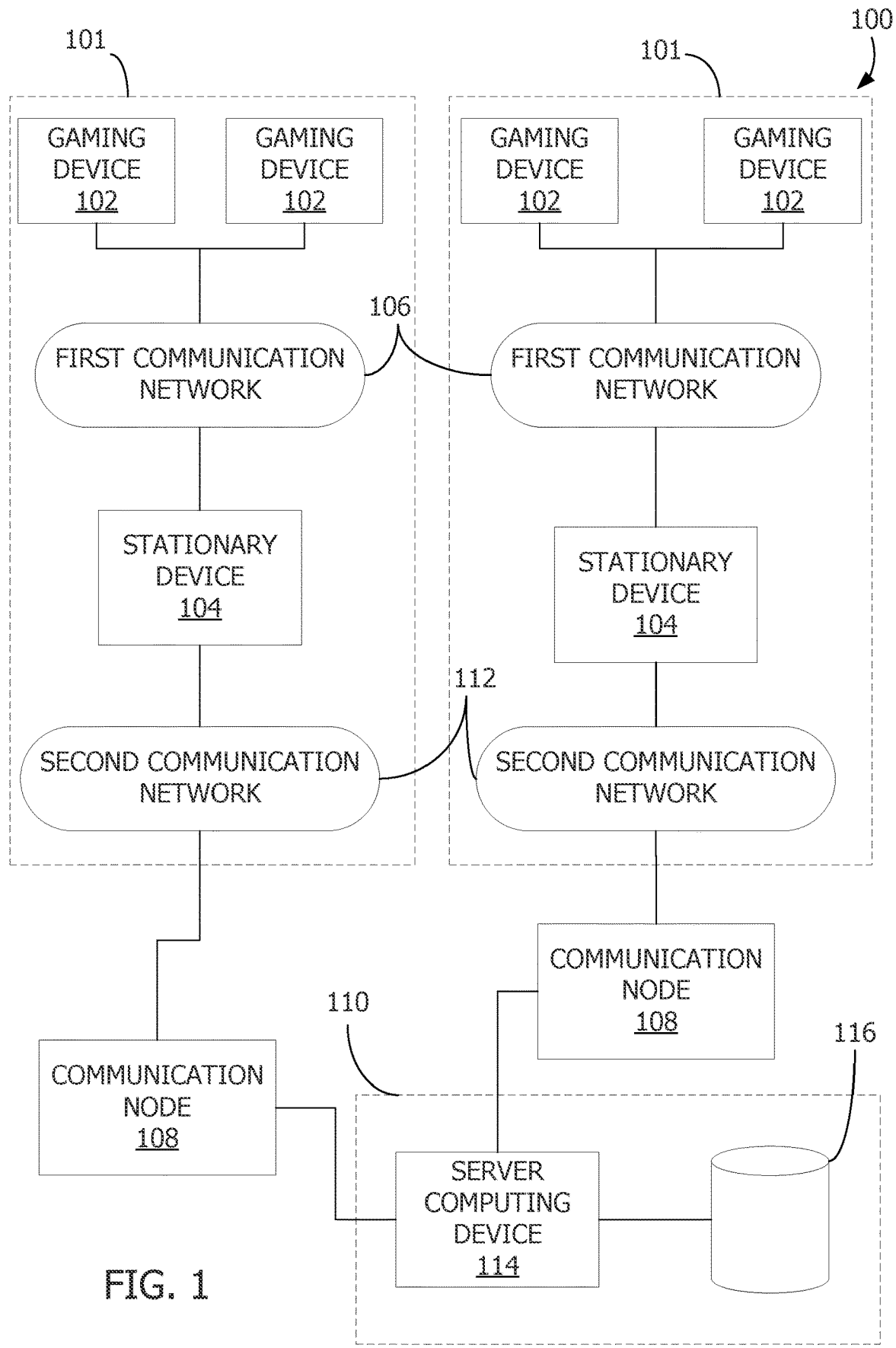
FIG. 1 is a block diagram of an example networked gaming device system according to at least one embodiment.

The figures depict various embodiments for purposes of illustration only. One skilled in the art who also has the benefit of this disclosure may recognize from the following discussion that alternative embodiments of the structures and methods illustrated herein may be employed without departing from the principles described herein.

DETAILED DESCRIPTION

The present disclosure illustrates, in various embodiments, systems and methods of locating and communicating with networked, moveable gaming devices.

In the following description, circuits and functions may be shown in block diagram form in order not to obscure the descriptions in unnecessary detail. Conversely, specific circuit implementations shown and described are examples only and should not be construed as the only way to implement networked gaming devices unless specified otherwise herein. Additionally, block definitions and partitioning of logic between various blocks illustrates one possible embodiment. It may become apparent to one of skill in the art, who also has the benefit of this disclosure, that the embodiments disclosed may be practiced by various other partitioning solutions, all of which are contemplated herein.

Further, the term "module" is used herein in a non-limiting sense to indicate functionality of particular circuits and/or assemblies within embodiments of networked gaming device systems and is not be construed as requiring a particular physical structure, or particular partitioning between elements for performing the indicated functions.

When executed as firmware or software, the instructions for performing the methods and processes described herein may be stored on a computer readable medium. A computer readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

The processors described herein process data signals and may comprise various computing architectures such as a complex instruction set computer (CISC) architecture, a reduced instruction set computer (RISC) architecture, or an architecture implementing a combination of instruction sets. Although only a single processor may be shown, multiple processors may be included. The processors comprise an arithmetic logic unit, a microprocessor, a general purpose computer, or some other information appliance equipped to transmit, receive and process electronic data signals from an associated memory and/or one or more input/output devices The memory described herein stores instructions and/or data that may be executed and/or accessed by the associated processor. The instructions and/or data may comprise code for performing any and/or all of the techniques described herein. The memory may be a dynamic random access memory (DRAM) device, a static random access memory (SRAM) device, Flash RAM (non-volatile storage), combinations of the above, or some other memory device known in the art. While the memory may be shown within some devices, some of the memory can be remote, e.g., on a separate device connected to the device or via a WAN, e.g., a cloud-based storage device.

As used herein, a "gaming device" or "game device" refers to an apparatus associated with one or more aspects of a gaming environment. For example, a gaming device may include card-handling devices, shufflers, electronic gaming machines (EGMs), and/or other devices the provide gameplay features for a game. Gaming devices may also include devices that are not directly involved in gameplay, such as information kiosks, displays, currency conversion devices, and the like. The foregoing examples of gaming devices are for exemplary purposes only and do not limit the gaming devices to the examples mentioned above.

As used herein, a "gaming environment" or "casino environment" is a location or multiple locations in which one or more games (particularly, wagering games) are conducted. Although some gaming environments may not include any gaming devices, in the embodiments described herein, at least one gaming device is deployed at the gaming environment to facilitate play of the one or more games.

The systems and methods described herein facilitate data communication with, and location tracking of, networked gaming devices. These gaming devices may be moveable within and outside of one or more gaming environments to enable operators of the gaming environments to customize the gaming environments and remove the gaming devices from the gaming environments for maintenance. In the systems and methods described herein, each gaming device includes a device transceiver for data communication over a first communication network. The gaming environment includes one or more stationary devices, such as stationary gaming tables, that have transceivers that communicatively couple to the device transceivers of the gaming devices to exchange gaming data via the first communication network. The transceivers are further communicatively coupled to a server via a second communication network to enable the server to collect the gaming data from the gaming devices and the stationary devices for analysis and historical storage.

In the systems and methods described herein, the stationary devices have a known or predetermined location within the gaming environment. The device transceivers, the transceivers of the stationary devices, and/or other computing modules associated with the gaming devices or stationary devices monitor data signals transmitted between each gaming device and each stationary device to calculate a relative distance measurement between the gaming device and the stationary device. The distance data associated with a gaming device is collected and analyzed by the gaming device to determine its location relative to the stationary devices. The location data generated by the gaming devices may be collected by the server to facilitate centralized storage and analysis of the location data. Based on the location data, the server may automatically determine which gaming devices are active, what game that the gaming devices are being used for, which gaming environment the gaming devices are located in, and/or other data relevant to the device location.

The technical problems addressed by the systems and methods described herein may include, for example: (i) data network congestion from transmitting gaming data over populated network channels; (ii) imprecise location determinations of gaming devices and users within gaming environments; (iii) manual configuration of game devices for a particular game; (iv) imprecise usage data collection for gaming devices; and (v) reactive maintenance of gaming device malfunctions.

The technical solutions that may be provided by the systems and methods described herein may include, for example: (i) reduced data network congestion by using network channels other than the populated network channels and frequency bands; (ii) improved precision of locating gaming devices and users within gaming environments; (iii) automated configuration of game devices for a particular game; (iv) improved usage data collection for gaming devices; (v) proactive maintenance of gaming devices to reduce the frequency of device malfunctions; and (vi) reduced cost and complexity of transceivers by consolidating data communication and location services using the same communication network.

FIG. 1 is a block diagram of an example networked gaming device system 100 for use within one or more gaming environments 101. The system 100 includes one or more gaming devices 102, a plurality of stationary devices 104, a first network 106, one or more communication nodes 108, a server system 110, and a second communication network 112. In other embodiments, the system 100 may include additional, fewer, or alternative subsystems, including those described elsewhere herein.

The gaming devices 102 are moveable devices configured to facilitate play of games within the gaming environments 101. In the example embodiment, the gaming devices 102 are deployed in two gaming environments, e.g., two casinos. In other embodiments, the gaming devices 102 may be deployed to a different number of gaming environments (including one).

Figure 2:
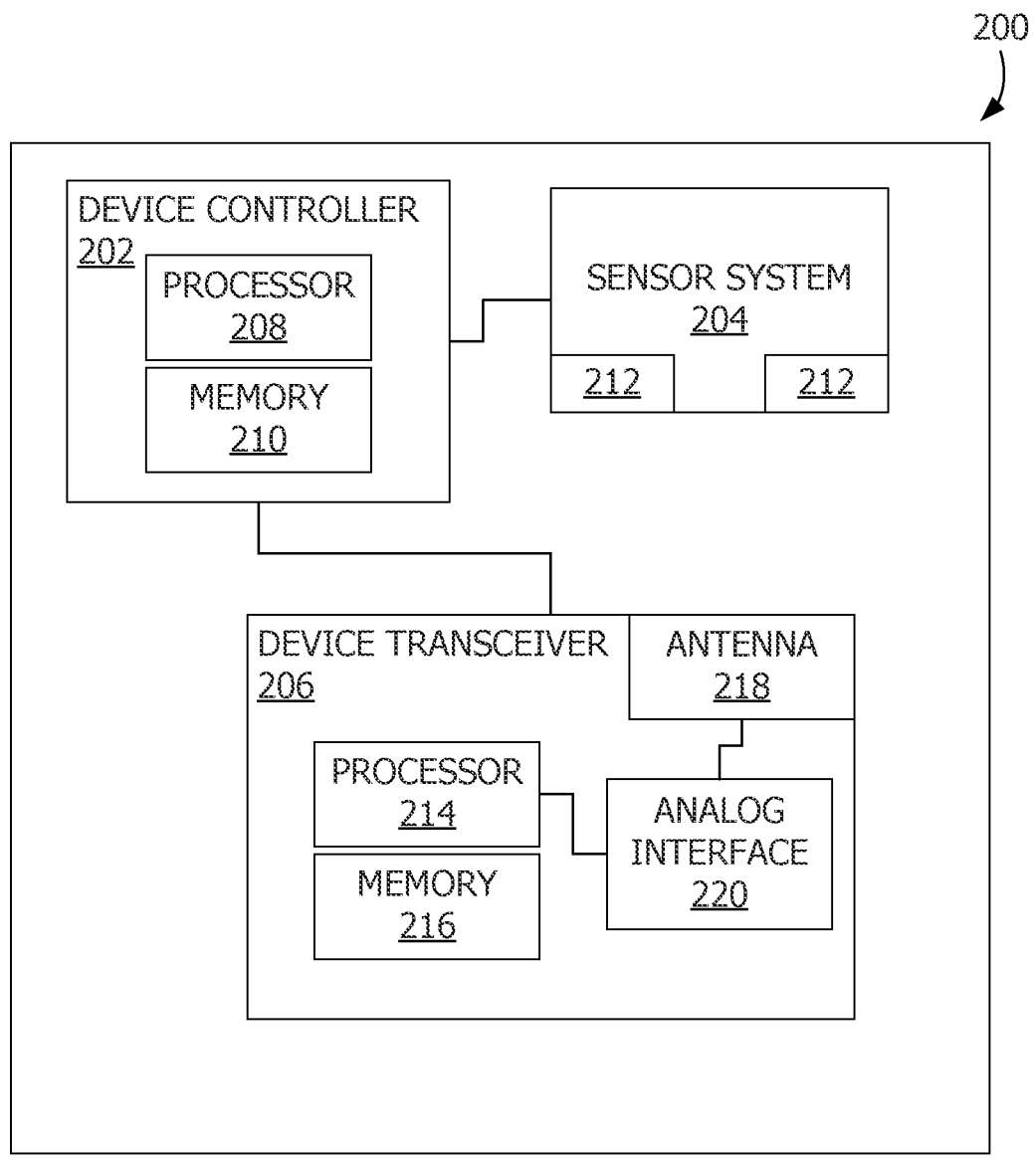
FIG. 2 is a block diagram of an example gaming device according to at least one embodiment.

FIG. 2 is a block diagram of an example gaming device 200 that may be used with a networked gaming device system, such as the system 100. The gaming device 200 includes a device controller 202, a sensor system 204, and a device transceiver 206. In other embodiments, the gaming device 200 may include additional, fewer, or alternative components, including those described elsewhere herein.

The device controller 202 is configured to monitor and/or control operation of the gaming device 200. The device controller 202 includes one or more processors 208 and associated memory 210. The memory 210 stores computer-readable instructions that, when executed by the processors 208, cause the device controller 202 to function as described herein. For example, when the gaming device 200 is a card-handling device, the device controller 202 may be configured to cause the gaming device 200 to receive cards from a dealer, shuffle the cards, and output the shuffled cards to the dealer for use in a card-based game (e.g., poker or blackjack).

The sensor system 204 includes one or more sensors 212 that are configured to collect sensor data associated with the gaming device 200. For example, the sensor system 204 of a card-handling device may include one or more image sensors to capture images of each card passing through a portion of the card-handling device. In another example, the sensor system 204 may include one or more sensors to identify user input and/or credit inputs (e.g., bills, coins, tickets, etc.) from a player. The sensors 212 may be configured to collect any suitable sensor data associated with the gaming device 200 and/or the environment surrounding the gaming device 200, such as motion data, image data, strain data, pressure data, temperature data, usage data, maintenance-related data, and the like. In the example embodiment, the sensor system 204 is communicatively coupled to the device controller 202 to transmit the sensor data. In certain embodiments, the sensor system 204 is communicatively coupled to the device transceiver 206 to transmit the sensor data. Alternatively, the gaming device 200 may not include the sensor system 204.

The device transceiver 206 is communicatively coupled to the device controller 202 and the first communication network 106 (shown in FIG. 1). Although the device transceiver 206 is shown within the gaming device 200, in some embodiments, the device transceiver 206 may be positioned externally from the device 200, such as an add-on or after-market device. In such embodiments, the device transceiver 206 may be communicatively coupled to the controller 202 via wired, contact and/or wireless communication. For example, the device 200 may be include one or more data ports or antenna to connect to the device transceiver 206. In the example embodiment, the device transceiver 206 includes one or more transceiver processors 214, associated memory 216, an antenna 218, and an analog interface 220. In some embodiments, the device transceiver 206 includes additional, fewer, or alternative components, including those described elsewhere herein. For example, the device transceiver 206 may include a power storage device (e.g., a battery) to facilitate operation while the device controller 202 is inactive. Similarly, the device transceiver 206 may be configured to operate in a low-power mode to function as described herein while the device controller is inactive. In other embodiments, the device transceiver 206 is at least partially integrated with the device controller 202. In one example, the transceiver processors 214 and/or the memory 216 are part of the processors 208 and the memory 210, respectively. In such an example, the processes and functions of the transceiver processors 214 and the memory 216 may be implemented as dedicated modules or applications within the processors 208 and the memory 210. In another example, each component of the device transceiver 206 is included within the device controller 202.

The device transceiver 206 is configured to communicate data associated with the gaming device 200 to and from the first communication network 106 and determine the relative location of the gaming device 200 as described in detail herein. In particular, the device transceiver 206 is configured to communicate data in accordance with the communication protocols of the first communication network 106. In one example, the first communication network 106 is an ultra-wideband communication network. Ultra-wideband communication, unlike some common types of wireless communication (e.g., Wi-Fi and Bluetooth), is not restricted to heavily populated frequency bands (e.g., 2.4 GHz and 5 GHz). Rather, ultra-wideband communication may be performed at other, less-populated, frequency bands that still provide relatively high data speeds. In one example, the ultra-wideband network may be configured to facilitate communication at a plurality of frequency bands from 3.5 GHz to 6.5 GHz with data rates of 110 kbps, 850 kbps, or 6.8 Mbps. In addition, in comparison to wired communication networks, wireless communication using ultra-wideband facilitates improved portability of the gaming device 200 and increased flexibility for arranging the device 200 within a gaming environment without concern of wire access points and the like. In other embodiments, other suitable types of communication networks that avoid populated or saturated frequency bands may be used for the first communication network 106.

In the example embodiment, the first communication network 106 is a non-persistent communication network. That is, unlike Wi-Fi, which uses routers to maintain a persistent communication signal for connecting devices to the Wi-Fi network, each device communicatively coupled to the network 106 includes a transceiver (e.g., the device transceiver 206) for discovering and establishing communication with other devices. In other embodiments, the first communication network 106 is a persistent network.

The antenna 218 of the device transceiver 206 is configured to receive and transmit data signals with other devices via the first communication network 106. In some embodiments, the device transceiver 206 may include more than one antenna 218, such as one antenna 218 for receiving signals and another antenna 218 for transmitting signals. In the example embodiment, the data signals received and transmitted by the antenna 218 are analog signals. The analog interface 220 is communicatively coupled to the antenna 218 to convert received data signals to a digital format compatible with the transceiver processor 214 and to convert digital data signals from the processor 214 to an analog format for transmission via the first communication network 106.

In at least some embodiments, the device transceiver 206 includes other components that facilitate the operation of the transceiver processor 214, the antenna 218, and/or the analog interface 220, such as, but not limited to, clock generators, phase-lock-loop circuitry, state controllers, power supplies, power management circuitry, filter circuitry, communication interfaces with the device controller 202, and the like. In some embodiments, the device transceiver 206 is powered separately from the device controller 202 to enable communication even if the gaming device 200 is in an inactive (i.e., powered-off) state. In such embodiments, the device transceiver 206 may enter a low-power mode while the gaming device is inactive to conserve power.

With respect again to FIG. 1, the stationary devices 104 are positioned around the gaming environment. Rather than being permanently fixed to a particular location (though some stationary devices 104 may be permanent fixtures), the stationary devices 104 are typically located at a single, predetermined location for a period of time (e.g., one hour, one day, one month, etc.). For example, the stationary devices 104 may include, but are not limited to, gaming tables, building structural components (e.g., walls, stairs, celling panels, etc.), and/or other similar devices. Likewise, although the gaming devices 102 may be moveable or portable, the gaming devices 102 may remain stationary for an extended period of time. In some cases, a gaming device 102 may be deployed at a stationary device 104 until maintenance is required, and some gaming devices 102 may be moved together with the corresponding stationary device 104. As an example, a card-handling device coupled to a gaming table may remain coupled to the table other than during periods of maintenance and may be relocated within a gaming environment together with the table.

For exemplary purposes herein, the stationary devices 104 are stationary gaming tables positioned within the gaming environment. However, the details described below with respect to the gaming tables 104 are not limited to gaming tables and may be applicable to other stationary devices. Moreover, in some embodiments, the stationary devices 104 may include a variety of different types of stationary devices.

Figure 3:
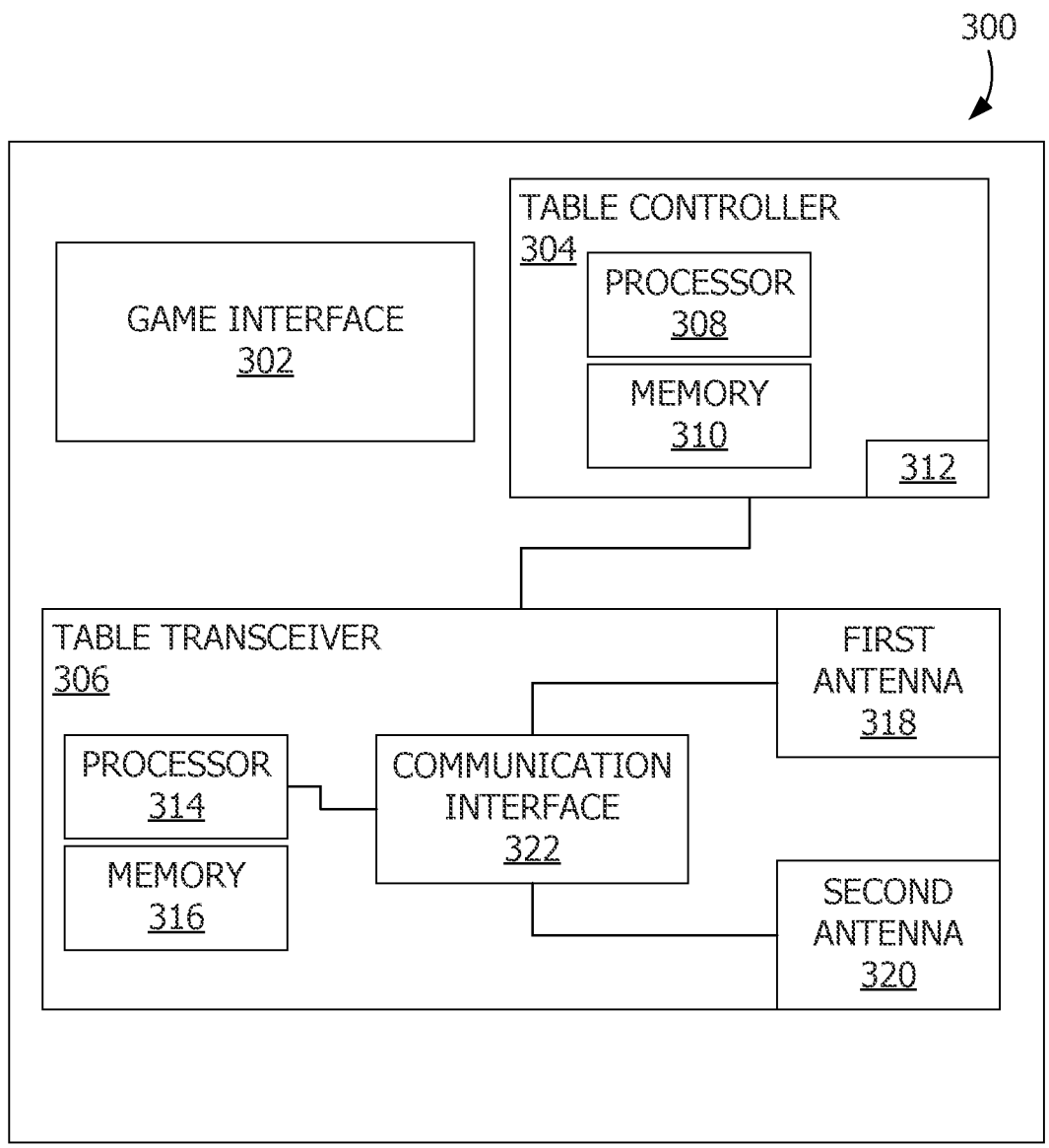
FIG. 3 is a block diagram of an example gaming table according to at least one embodiment.

FIG. 3 illustrates an example stationary gaming table 300 that may be used with a networked gaming device system, such as the system 100. The gaming table 300 includes a game interface 302, a table controller 304, and a table transceiver 306. In other embodiments, the gaming table 300 may include additional, fewer, or alternative components, including those described elsewhere herein.

The game interface 302 is an area of the gaming table 300 that is used for play of a game. For example, the upper felt surface including game symbols on a poker table is the game interface 302. The game interface 302 may be configured to include one or more gaming devices (e.g., the gaming devices 102, shown in FIG. 1) and/or other devices that facilitate play of a game. In one example, the game interface 302 includes one or more displays, lights, and/or input devices for a game.

The table controller 304, similar to the device controller 202 shown in FIG. 2, is configured to monitor and/or control operation of one or more devices associated with the gaming table 300, including the table 300 itself in some embodiments. The table controller 304 includes one or more table processors 308 and associated memory 310 for executing computer-readable instructions to perform the functions of the table controller described herein. The table controller 304 may be configured to coordinate the various devices associated with the gaming table to provide consistent gameplay of the game. For example, if the gaming table 300 includes individual displays for each player, the table controller 304 may be configured to cause each display to display information relevant to the respective players.

In the example embodiment, the table controller 304 includes one or more sensors 312 for collecting sensor data. The sensors 312 may include, but are not limited to, image sensors, pressure sensors, light sensors, audio sensors, and the like. The table controller 304 may analyze the sensor data to determine the state of the game, gaming devices, operators, and/or players associated with the gaming table 300.

The table transceiver 306 is physically coupled to the gaming table 300 and is configured to communicate with the first communication network 106 and the second communication network 112 (both shown in FIG. 1). The table transceiver 306 is further communicatively coupled to the table controller 304 to facilitate communication between the table controller 304 and the first and/or second communication networks 106, 112. In other embodiments, the table controller 304 may be separate and independent from the table transceiver 306. In the example embodiment, the table transceiver 306 includes one or more processors 314, associated memory 316, a first antenna 318, a second antenna 320, and a communication interface 322. The memory 316 stores instructions that, when executed by the processors 314, cause the device transceiver to function as described herein. In other embodiments, the table transceiver 306 may include additional, fewer, or alternative components, including those described elsewhere herein.

In some embodiments, the table controller 304 and the table transceiver 306 may be at least partially integrated with each other. For example, the table processors 308 and the memory 310 may be integrated with the processor 314 and the memory 316, respectively. As another example, the sensors 312 may be incorporated with the table transceiver 306. In other embodiments, the gaming table 300 does not include a table controller 304, and the table transceiver 306 operates independently. In such embodiments, the gaming table 300 may not include devices controllable by the controller 304 or the devices are configured to operate without control from the table controller 304.

The first antenna 318 is configured to transmit and receive data signals via the first communication network 106, whereas the second antenna 320 is configured to transmit and receive data signals via the second communication network 112. The antennae 318, 320 may include more than one antenna each to facilitate communication. In certain embodiments, a single antenna may be used to communicate with both the first and second communication networks 106, 112. The communication interface 322 is communicatively coupled to the antennae 318, 320 to convert data signals between analog and digital formats and perform any other suitable functions to facilitate communication. In certain embodiments, the table transceiver 306 may be divided into separate modules for communication with the first communication network 106 and the second communication network 112. That is, at least the antennae 318, 320 may be separated into different physical modules. The processors 314, the memory 316, and/or the communication interface 322 may be divided between the separate modules. In at least some embodiments, the table transceiver 306 may include other components and subsystems to facilitate the functions described herein. For example, the table transceiver 306 may include circuitry for power supply, power management, signal filtration, state management, other network interfaces, and/or other suitable functionality.

With respect to both FIGS. 1 and 3, the second communication network 112 is configured to facilitate communication with a plurality of gaming tables 300 and other stationary devices using a reduced number of communication nodes 108. That is, the second communication network 112 is configured for relatively long-range, low interference communication to enable one or more communication nodes 108 to communicate with a plurality of gaming tables 104 deployed throughout a gaming environment. In addition, similar to the first communication network 106, the second communication network 112 is configured to facilitate communication outside of the commonly populated frequency bands to avoid signal interference. The second communication network 112 may be a different type of network and/or use a different frequency band in comparison to the first communication network 106. In the example embodiment, the second communication network 112 is a Long Range (LoRa) communication network. LoRa networks communicate using radio signals having frequencies below 1 GHz to facilitate relatively long communication ranges, relatively low power consumption, and/or other network features, such as end-to-end encryption and relatively high communication bandwidth. The use of a wireless second communication network 112 facilitates increased flexibility in deploying the gaming tables throughout a gaming environment, and the use of a LoRa network with a relatively large communication range reduces the number of communication nodes 108 that need to be deployed to communicate with the gaming tables 300. In other embodiments, other suitable types of networks may be used as the second communication network 112. Alternatively, the second communication network 112 may be integrated with the first communication network 106.

The communication node 108 is a network interface communicatively coupled to the server system 110 and the second communication network 112 at a respective gaming environment 101. The communication node 108 facilitates communication between the gaming tables 104 and the server system 110 for data transmission, locating gaming devices 102 within the gaming environments 101, and the like. The communication node 108 may include any suitable network components to communicate with both the second communication network 112 and the server system 110. For example, the communication node 108 may include a transceiver configured to transmit data signals in accordance with the protocols of the second communication network 112. In another example, the communication node 108 may be communicatively coupled with the server system 110 via any form of wireless or wired connections or any combination thereof. By way of example and not limitation, communication between the communication node 108 and the server system 110 may be comprised of serial data links, parallel data links, USB, Ethernet, a Wide Area Network (WAN), a Local Area Network (LAN), infrared communication, IEEE 802.16 (or WiMax), IEEE 802.11a/b/g/n/p, Wi-Fi, and any public cellular phone network including, but not limited to, GSM, CDMA, 3G, or 3GPP Long Term Evolution (LTE), communication, etc.

In the example embodiment, each gaming environment 101 includes one communication node 108 for communicating with the gaming tables 104 at the respective gaming environment 101. In other embodiments, a plurality of communication nodes 108 may be configured to communicate with the second communication network 112 at a single gaming environment 101. Alternatively, a communication node 108 may be configured to communicate with the second communication network 112 over multiple gaming environments 101. In certain embodiments, the communication node 108 may be configured to communicatively couple to the first communication network 106 in addition to or instead of the second communication network 112. In such embodiments, the communication node 108 may communicate with the gaming devices 102 and/or the gaming tables 104 via the first communication network 106. In one example, the communication node 108 is configured to communicate with relatively nearby devices 102 and/or tables 104 via the first communication network 106 (i.e., devices and tables within the effective communication range of the communication node 108 using the first communication network) and to communicate with other tables 104 via the second communication network 112 that has a greater effective communication range than the first communication network 106.

The server system 110 includes one or more server computing devices 114 and a server database 116. The server system 110 may be centralized (i.e., the server computing device 114 and the server database 116 are integrated with each other) or distributed. The server system 110 is configured to collect data from the gaming devices 102 and the gaming tables 104 via the communication node 108 and the second communication network 112, analyze the data, and/or store the data. In one example, the server system 110 monitors usage of the gaming devices 102 within the gaming environments 101. In another example, the server system 110 determines a location of each deployed gaming device 102 as described herein.

The server computing device 114 is configured to execute at least a portion of the tasks performed by the server system 110 as described herein, such as requesting data from the gaming tables 104, analyzing the data from the gaming tables 104, and storing data within the server database 116. In the example embodiment, the server computing device 114 is configured to receive data indicating a relative location of each gaming device 102 for storage and analysis of the location data. In certain embodiments, the server computing device 114

The server database 116 is configured to store data generated by the server system 110 and/or data collected from the gaming tables 104. In some embodiments, the server database 116 is formed by a plurality of distributed databases. In one example, the server database 116 is configured to store data collected from the gaming tables 104, game settings associated with one or more games, usage data for each gaming device 102, reports generated by the server computing device 114, and/or a dynamic map indicating a location of each gaming device 102 within the gaming environments 101.

Figure 4:
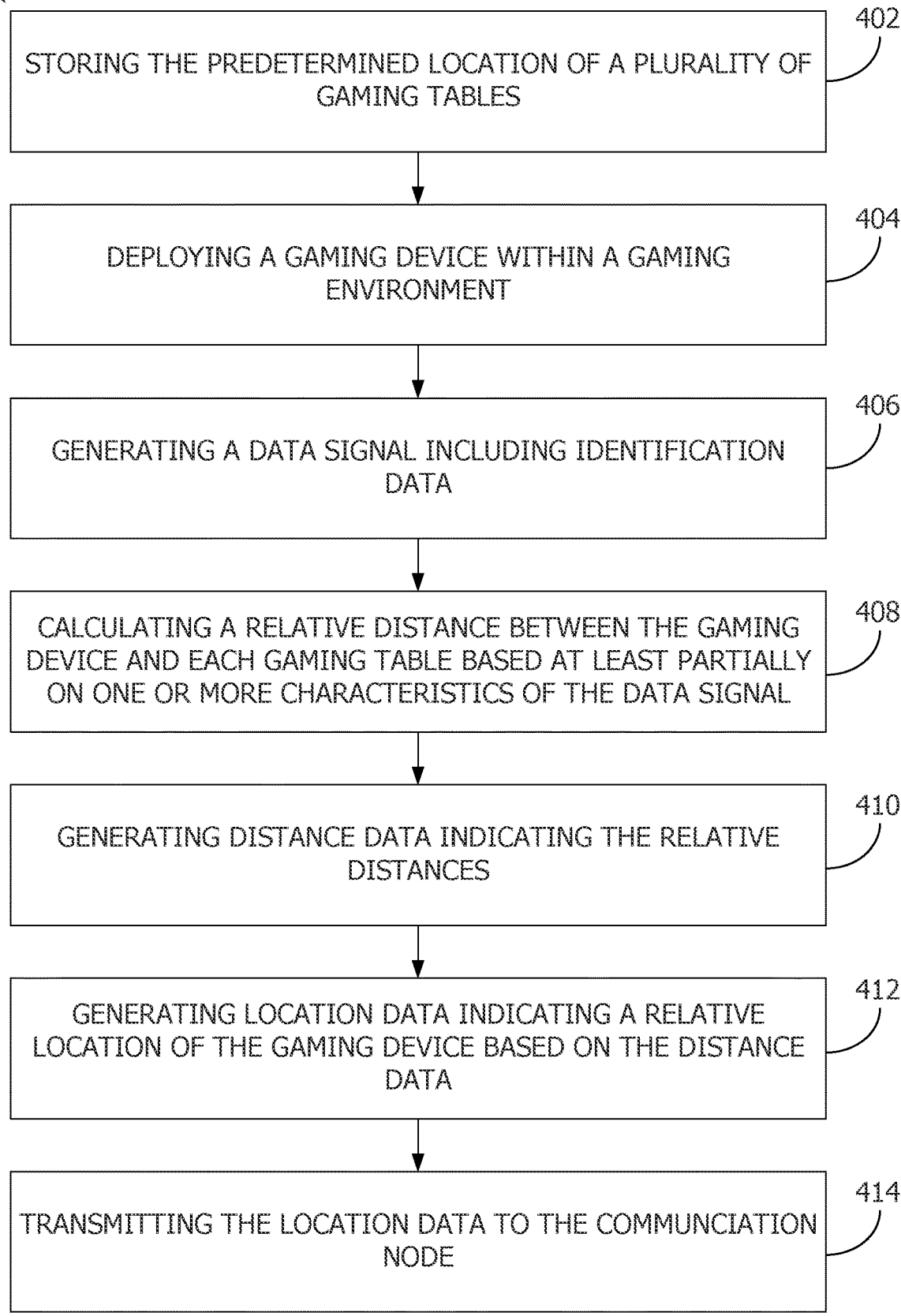
FIG. 4 is a flow diagram of an example method for locating gaming devices using a networked gaming device system in accordance with at least one embodiment.
Figure 5:
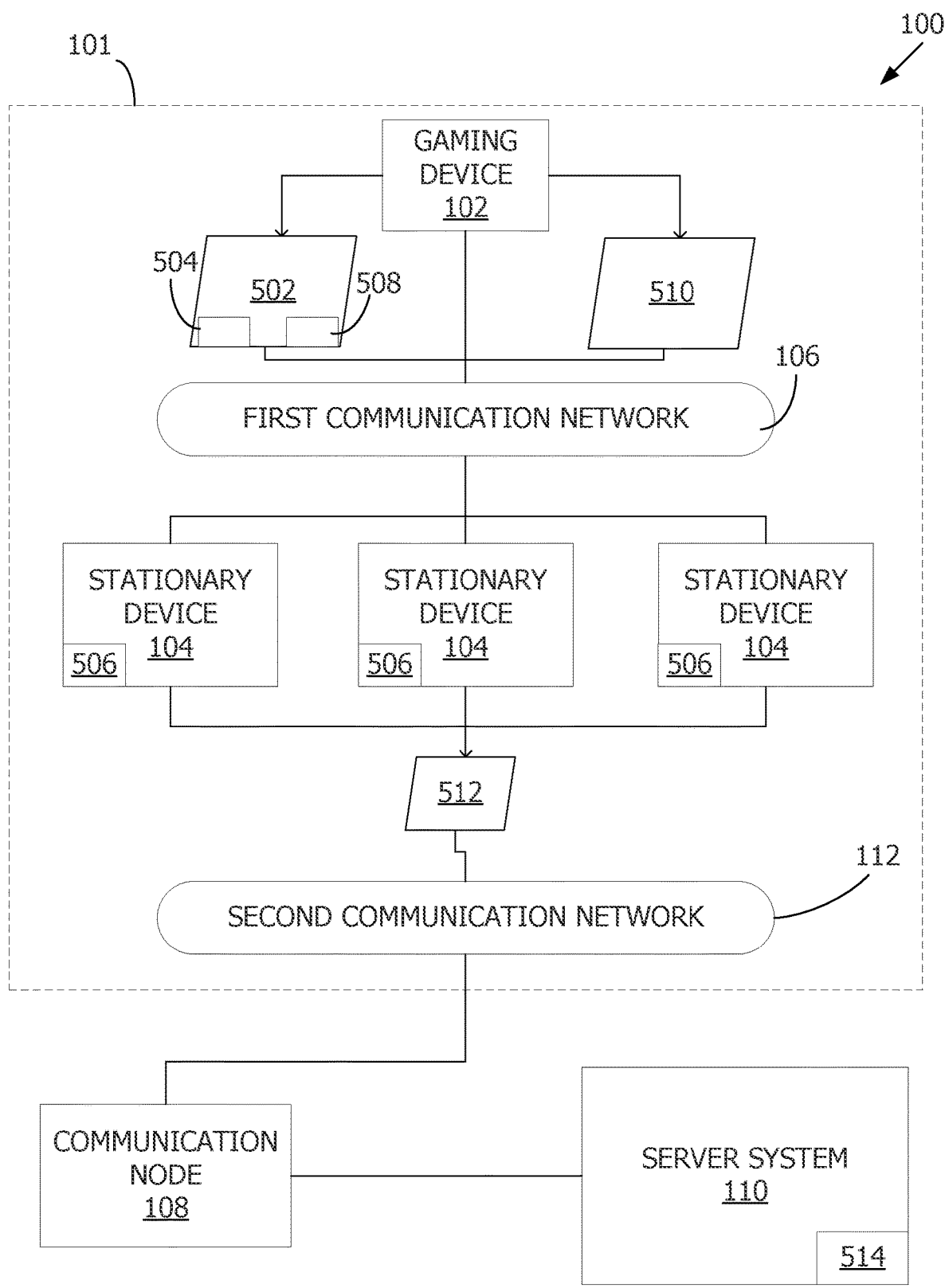
FIG. 5 is a data flow block diagram of the method shown in FIG. 4.

FIG. 4 is a flow diagram of an example method 400 of locating a gaming device 102 within a gaming environment 101 using the networked gaming device system 100. FIG. 5 is a data flow diagram 500 of the method 400 using the networked gaming device system 100. The method 400 may be used to locate a plurality of gaming devices 102 within multiple gaming environments 101 to provide a dynamic map of where each device 102 is located, if the device 102 is active (i.e., in use), and/or what gaming table 104 is associated with each device 102. In other embodiments, the method 400 may include additional, fewer, or alternative steps, including those described elsewhere herein. Moreover, at least some of the steps described herein performed by the gaming device 102, the gaming tables 104, the communication node 108, and/or the server system 110 may be performed using one or more computing devices and/or processors, such as the computing devices and processors described above with respect to FIGS. 1-3.

In the example embodiment, with respect to both FIGS. 4 and 5, the gaming tables 104 are deployed within a gaming environment 101 and establish communication with the communication node 108. The gaming tables 104 have a predetermined location within the gaming environment 101. The location may be provided as, for example, geographical coordinates, coordinates within a map of the gaming environment 101 (and any surrounding areas), and/or other suitable forms of specifying location. In one example, a map of the gaming environment is divided into a grid, where each cell of the grid can be filled with a gaming table 104. In some embodiments, the predetermined location is identified and assigned to the gaming tables 104 manually. In other embodiments, the location of each gaming table 104 is determined automatically by the server system 110 and/or the respective gaming tables 104. In one example in which a gaming table 104 is communicatively coupled to at least three communication nodes 108 via a LoRa second communication network 112, the location of the gaming table 104 may be determined as a function of the timestamps of a data signal generated by the transceiver of the gaming table 104 (e.g., table transceiver 306, shown in FIG. 3) and received by each communication node 108. The server system 110 stores 402 the predetermined location of each stationary gaming table 104 for the location determination described herein. Each stationary gaming table 104 may also store its respective location. In certain embodiments, each gaming table 104 may be associated with one or more games to be played at the gaming table 104. That is, a gaming table 104 is assigned one or more games and, in some embodiments, game settings may be stored by the gaming table 104 for the games.

The gaming device 102 is then activated and deployed 404 within the gaming environment 101. Although each gaming table 104 is assumed to be within communication range of the gaming device 102 for exemplary purposes, other gaming tables 104 may be deployed outside of the communication range of the gaming device 102. When activated, the gaming device 102 is configured to receive 406 data signals 502 including identification data 504 from each gaming table 104 via the first communication network 106. The identification data 504 identifies the gaming table 104 from which the respective data signal 502 originates. The identification data 504 may include, but is not limited to, a unique identifier, a type of game, supported game device and/or other suitable data associated with the gaming table 104 that may be used to locate and configure the gaming device 102. The data signal 502 is received by the gaming device 102 and the identification data 504 is extracted to identify each gaming table 104. In at least some embodiments, the device transceiver and/or the controller of the gaming device 102 (e.g., device controller 202 and device transceiver 206, both shown in FIG. 2) automatically generates a timestamp 506 at the time that each data signal 502 was received. In at least some embodiments, the gaming device 102 is configured to generate the data signal 502 to be received by the gaming tables 104. In such embodiments, the gaming tables 104 are configured to generate the timestamps 506 for each received data signal 502. The data signal 502 may be generated by both the gaming device 102 and the gaming tables 104. For example, one gaming device 102 may receive data signals 502 from the gaming tables 104 and/or other gaming devices 102. In such embodiments, the gaming devices 102 may treat the data signals 502 from other gaming devices 102 similar to data signals from gaming tables 104 for purposes of determining location as described herein. Likewise, in another example, one stationary gaming table may receive data signals 502 from gaming devices 102 and/or other stationary gaming tables 104. In certain embodiments, the data signal 502 may be transmitted in response to a data signal received by the gaming device 102 or the gaming tables 104.

In the example embodiment, one or more characteristics of the data signal 502 may be used to calculate 408 a relative distance between the gaming device 102 and each of the gaming tables 104. The characteristics may include, but are not limited to, amplitude, phase, frequency, phase, time-of-transmission, time-of-flight, time-of-arrival, and/or signal intensity. In one example, if the first communication network 106 is an ultra-wideband network, the characteristic may preferably be a time-of-flight characteristic or a time-difference-of-arrival characteristic. In at least one example, the relative distance between the gaming device 102 and one of the gaming tables 104 is at least partially a function of the frequency of the data signal 502, the speed of light, and/or the time the data signal 502 was received (i.e., the timestamp 506). In some embodiments, the gaming tables 104 generate a respective transmission timestamp 508 and include the transmission timestamps 508 with the respective data signals 502. The internal clocks of the gaming tables 104 may be synchronized to improve the accuracy of the timestamps 508. In such embodiments, the difference between the timestamp 506 at which the signal 502 was received and the transmission timestamp 508 indicates a relative distance between the gaming device 102 and the gaming table 104.

Unlike other types of communication networks, the use of the time-of-flight characteristic or the time-difference-of-arrival characteristic provides improved accuracy of the distance determination in comparison to methods relying upon signal strength, which may be impacted by various other factors beyond distance (especially in gaming environments populated with devices and structures that may impact signal strength). Synchronizing the internal clocks of the gaming device 102 and/or the gaming tables 104 facilitates increased precision in calculating the relative distances.

The gaming device 102 and/or the gaming tables 104 generate 410 distance data 510 indicating the calculated relative distances between the gaming device 102 and each gaming table 104. The distance data 510 may include, but is not limited to, a distance measurement, an identifier of the associated gaming table 104, the timestamp 506, the transmission timestamp 508, and/or other data that facilitates determining the relative distances to the gaming device 102. In some embodiments in which the gaming tables 104 generate the distance data 510, each gaming table 104 generates its respective distance data 510. Alternatively, the gaming device 102 may generate the distance data 510 for the gaming tables 104. In such embodiments, the gaming device 102 may transmit the distance data 510 to each respective gaming table 104.

In the example embodiment, the gaming device 102 collects the distance data 510 for at least a portion of the calculated distances. That is, in some embodiments, the gaming device 102 may filter out distances exceed a threshold distance to reduce computational burden of the location determination analysis described herein. In addition, the gaming device 102 collects the predetermined locations of the gaming tables 104. In certain embodiments, the locations are included within the identification data 504. In other embodiments, the locations are collected via other data signals received by the gaming device 102. The gaming device 102 is configured to determine its relative location within (or near) the gaming environment 101.

The gaming system 102 compares the timestamps and/or distances of the distance data 510 with the predetermined locations of the gaming tables 104. Using trilateration or other suitable location-determination techniques, the location of the gaming device 102 is identified at least partially as a function of the distance data 510. For example, if the relative distances are calculated between the gaming device 102 and at least three gaming tables 104 while accounting for the known locations of the gaming tables, the gaming device 102 can determine the location of the gaming device 102 relative to the gaming tables 104. In comparison to location-determination techniques that use satellites, signal towers, and the like that are remotely located from the gaming environment 101 and susceptible to interference from other devices and structures, determining location relative to the gaming tables 104 facilitates improved accuracy in the location determination of the gaming device 102. Moreover, by performing the location determination locally at the gaming device 102, the location can be determined even without reliance on external computing systems. In certain embodiments, rather than determining a specific location of the gaming device 102, the gaming device 102 identifies a gaming table 104 associated with the gaming device 102 as described herein and assigns itself the predetermined location of the associated gaming table 104.

In response to determining its relative location, the gaming device 102 generates 412 location data 512 to be transmitted to the communication node 108. The location data 512 indicates the relative location and may also include other suitable data, such as a game data, maintenance scheduling data, and/or the like. The gaming device 102 may transmit 414 the location data 512 to the communication node 108 via one or more gaming tables 104 and the second communication network 112. The communication node 108 collects the location data 512 and transmits the data 512 to the server system 110 for storage and analysis. In some embodiments, the gaming tables 104 and/or the server system 110 may generate the distance data 510 and/or the location data 512 rather than the gaming device 102. In such embodiments, the gaming tables 104 and/or the server system 110 may collect the corresponding data to generate the distance data 510 and/or the location data 512. In one example, the gaming device 102 generates the distance data 510 and transmits the distance data 510 to the server system 110. The server system 110 then generates the location data 512 as a function of the predetermined locations of the gaming tables and the distance data 510.

The method 400 may be repeated for a plurality of gaming devices 102 such that the server system 110 may identify and monitor the location of every gaming device 102 deployed within the gaming environment 101. In at least some embodiments, gaming devices 102 that are not deployed within the gaming environment 101 may notify the server system 110 of its location. In one example, at least some gaming devices 102 may include power storage devices (e.g., batteries) and/or low-power modes to facilitate location determination while the gaming devices 102 are not deployed. In other embodiments, the absence of a location determination by a particular gaming device 102 may be inferred that the gaming device 102 is not deployed and inactive. These gaming devices 102 may be in storage, maintenance, at other gaming environments 101, and the like. Monitoring the location of the devices 102 may provide increased awareness of the how the gaming devices 102 are being used.

In at least some embodiments, the server system 110 is further configured to generate a dynamic map 514 of the gaming environment 101 that identifies the location of each gaming device 102 and each gaming table 104. The dynamic map 514 may be presentable to an operator for analysis. The location of the gaming devices 102 may be updated over time to monitor the current and historical movements of the gaming devices 102. The server system 110 may be configured to prompt the gaming devices 102 and/or the gaming tables 104 to generate the location data 512 periodically to update the dynamic map 514. In other embodiments, the gaming devices 102 and/or the gaming tables 104 may generate location data 512 in response to the gaming devices 102 moving relative to the gaming tables 104 and may transmit the location data 512 to the server system 110 via the communication node 108 to update the dynamic map 514. Alternatively, in embodiments in which the server system 110 generates the location data 512, the gaming devices 102 and/or the gaming tables 104 transmit updated distance data 510 to the server system 110 to update the dynamic map 514.

Figure 6:
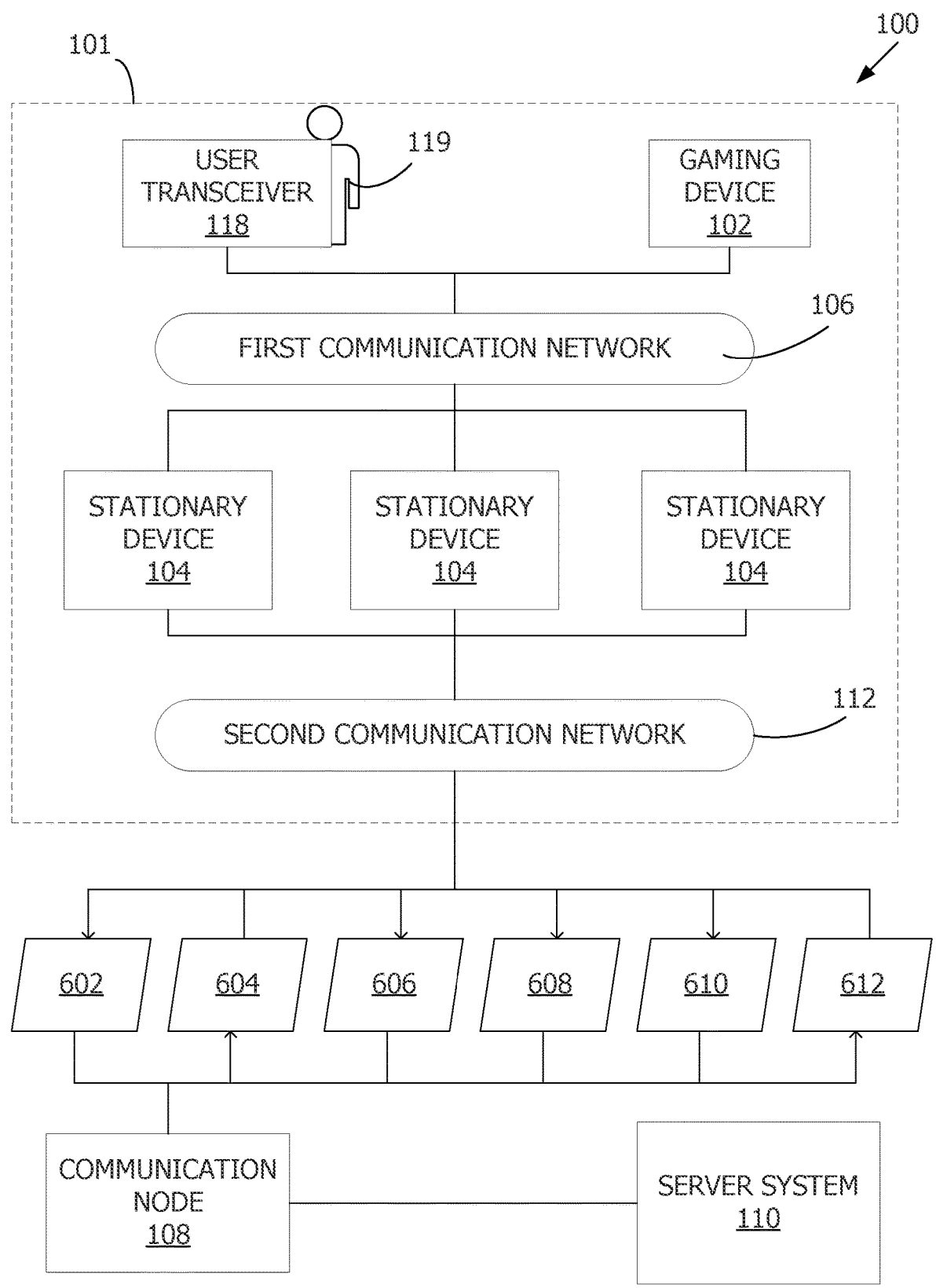
FIG. 6 is a data flow block diagram of data transmitted and generated by a networked gaming device system in accordance with at least one embodiment.

The networked gaming device system 100 is not limited to locating gaming devices 102 within a gaming environment 101. For example, the system 100 may also be used to generate and transmit gaming data, game settings, device data, usage data, and other suitable data associated with the system 100. FIG. 6 is a data flow diagram of exemplary data transmitted within the system 100 (shown in FIG. 1). In other embodiments, other data may be transmitted and/or generated by the system 100, including data described elsewhere herein.

In the example embodiment, a gaming device 102 may be associated with a particular stationary gaming table 104. For example, a card-handling device may be deployed to a table for play of a card-based game, such as blackjack or poker. Associating the gaming device 102 with the gaming table 104 may facilitate certain and/or prevent certain functionalities of the gaming device 102 and the gaming table 104. For example, other than data signals transmitted for location determination (e.g., the data signal 502, shown in FIG. 5), the gaming device 102 or the gaming table 104 may block other data from being transmitted to and/or received from unassociated devices. The associated gaming device 102 and gaming table 104 may be configured to generate and communicate game data 602 associated with play of the game. In at least some embodiments, the gaming device 102 is associated with a gaming table 104 based at least partially on the relative distances between the gaming device 102 and one or more gaming tables 102. For example, if the relative distance to the gaming table 104 is within a threshold predetermined distance (e.g., one meter or half of a meter) and no other gaming table 104 has a similar relative distance, the gaming device 102 may be associated with the relatively close gaming table 104. The association may also be partially based on the type of gaming device 102 and what game is to be played at a particular gaming table 104. For example, the gaming device 102 and/or the gaming tables 104 may broadcast game type, device type, and the like to each other. Based on the broadcasted data, the gaming device 102 and/or the gaming tables 104 determine whether or not the gaming device 102 is compatible. If a gaming device 102 is determined to be incompatible (e.g., a card-handling device for a dice-oriented table game), the gaming device 102 may ignore the incompatible gaming table 104 irrespective of its relative distance.

The association may be determined by the gaming device 102, the gaming tables 104, and/or the server system 110. In some embodiments, the gaming tables 104 and/or the server system 110 may store game settings 604 to configure the gaming device 102 for the game. The game settings 604 may include, but are not limited to, rules of the game, number of cards shuffled, number of available card decks, card information, artwork, animations, wagering thresholds, and/or other configurable aspects of the gaming device 102. The game settings 604 may be transmitted to the gaming device 102 in response to associating with the gaming table 104. The gaming device 102 may automatically be configured in accordance to the game settings to reduce necessary time to manually prepare the gaming device 102.

In response to associating the gaming device 102 to a gaming table 104, the gaming device 102 may transmit data to the gaming table 104 to be collected by the server system 110 via the communication node 108. The data may also include data generated by the gaming table 104. In some embodiments, the server system 110 is configured to periodically collect the data from the gaming tables 104 (i.e., via polling). In other embodiments, the gaming tables 104 transmit the data asynchronously to the communication node 108 for storage and analysis by the server system 110. At least some data may remain local to the associated gaming device 102 and gaming table 104 (i.e., the data is not transmitted to the communication node 108). The data may include, but is not limited to, the game data 602, device data 606, and location data 608 (e.g., the location data 512, shown in FIG. 5). The game data 602 includes data associated with the game played at the gaming table 104. Examples of game data 602 may include, but are not limited to, wager amounts, wagered outcomes, payouts, game outcomes, progressive jackpot amounts, number of players, bonus game outcomes, number of cards or decks remaining, image data associated with the game, number of shuffles, game play events, game sessions, use in a period, and/or other suitable data associated with the game.

The parameter of the number of shuffles can represent the number of full deck shuffles performed by the gaming device 102. When multiple decks are shuffled, the parameters can reflect the total number of decks shuffled. The parameter of the number of cards shuffled can represent the number of cards shuffled by the gaming device 102. In an embodiment when a particular card is shuffled multiple times over the course of a time period, the parameter is incremented each time the card is shuffled. In another embodiment, a card is shuffled once when the card is part of a shuffle process in which one or more decks of cards are completely shuffled.

The parameter of a game play event can represent the number of completed games/hands at a table 104. For example, one game play event for blackjack represents the dealing of cards between the placement of an initial bet and the final result of the hand. In one embodiment, if there are five players at a table, the completion of one hand for all players and the dealer represents five game plays, in some embodiments the dealer's hand is also counted so this represents six game plays, in another embodiment this represents one game play.

The parameter of a game session can represent a series of game plays/deals for a particular type of game played such as blackjack, THREE CARD POKER®, etc., without a significant break in play. For example, if a gaming device 102 is used for THREE CARD POKER® and is in continuous use, e.g., shuffling and dealing cards with no more than a five minute break (other break period criteria can be used), for six hours, then the gaming device 102 is used for blackjack, then the six hours of THREE CARD POKER® is one game play session.

The parameter of use in a period can represent the total amount of usage of the gaming device 102 in a period. Examples of usage are number of shuffles, number of cards shuffled, number of game play events, and/or game sessions. The information can assist in identifying trends in the amount of game plays of particular games, e.g., THREE CARD POKER®.

The device data 606 includes operating conditions, diagnostics, maintenance reminders, and/or other data associated with the gaming device 102. At least some of the device data 606 is collected by sensors (e.g., the sensor system 204, shown in FIG. 2) monitoring the gaming device 102.

In at least some embodiments, the server system 110 collects the game data 602, the device data 606, and/or the distance data 608 to generate usage data 610 associated with each gaming device 102. In some embodiments, the data received by the server system 110 may be collectively referred to as "operational data." The usage data 610 indicates how long the gaming device 102 has be active and in use, under what conditions, and/or other similar factors. The usage data 610 may be used to proactively identify gaming devices due for maintenance prior to device failure and/or to accurately monitor the use of rental or leased gaming devices within the gaming environments 101. Moreover, because the server system 110 monitors multiple gaming environments 101, the usage data 610 of gaming devices 102 that are deployed in multiple gaming environments over time may be captured by the system 100. The server system 110 may be configured to generate and present reports including the operational data for one or more gaming devices 102 and/or other data associated with the system 100. In certain embodiments, each gaming device 102 may be configured to generate its respective usage data 610 and transmit the usage data 610 to the server system 110 for storage and analysis.

In at least some embodiments, the system 100 may be used to facilitate leasing gaming devices 102 to operators of the gaming environments 101. In particular, the system 100 may facilitate billing based on actual usage of the gaming devices 102. In some embodiments, the system 100 permits the reporting period, and any associated billing period, to be of any duration and based on any type of, or combination of, use. In other embodiments, billing amounts may include maintenance charges, fees, or other payable service events. Types of use for a card-handling gaming device include, but are not limited to, cards or decks inserted into the card device, cards dispensed, cards counted, cards sorted, cards or decks checked for completeness, individual hands dealt, type of game played, individual games played, game sessions played, directly or indirectly based on any amount of winnings detected during play including any progressive, individual hand reports and game reports generated, and/or request for a report from a past card usage, past game or past session data including individual hands previously generated (past data may help a casino with a patron dispute, may help with a billing dispute, etc.). This may be downloaded to a card-handling device from a central location (e.g., the server system 110) where extended game data associated with each card-handling device may be stored, or, otherwise provided to a user (casino, operator) of the local card-handling device, if the device is unable to communicate or display the results of the request. Such data, billable events, and recallable events are based on the capabilities of each card-handling device. The level to which each card-handling device may record data in any form is reflected in the data kept at a central location for later recall, analysis, and use. Unsophisticated card-handling devices with limited reporting capabilities will have equally limited data available from any back-end system, while sophisticated card-handling devices will enable a back-end system to keep far more detailed records, respond to download requests for specific data and similar actions. The type of data available from a sophisticated card-handling device is limited only by its detectors and associated computer power. Any type of data related to card usage, deck usage or deck type (including, but not limited to, the deck's manufacturer and other data), deck or card count of any kind, ordering in a randomized deck or partial deck, data for each dealt or issued card for any event (including card counting or deck determinations, as well as game play events), and any other type of count or event based on cards in any manner used in a card-handling device is contemplated herein.

The collected data may be organized, analyzed, and reported in any manner useful for either billing, meaning creating bills for payment eventually sent to the user of the device, or, maintenance of any type, including actual and predictive failure analysis and/or predictive required maintenance reports. Predictive reporting may be based in part, or in whole, on statistical analysis of the use data, error logs, interrupt events, fault reports, and any and all data, if available, from detectors or detection circuits, detection ICs, or any type of element that is configured to log or generate data regarding the condition of any element, either itself or another element. In at least some embodiments, the server system 110 and/or the gaming devices 102 may generate one or more alerts or notifications to notify a user of particular events based on analysis of the operational data.

Examples of detector elements includes elements such as strain detectors or motion detectors located on, or associated with, mechanical components, and, failure detection ICs measuring various electrical/electronic properties of components so that anomalous events can be reported or logged. Similarly, detection elements may be failure detection (or condition monitoring) circuits contained in larger circuits reporting/logging performance deviations or apparent out-of-spec behaviors, and/or any other detection elements that generate logs, interrupts, or other events. This further includes firmware or software that may use algorithms coupled with input from one or more components or elements of any type (mechanical elements using or interfacing to mechanical-electrical, mechanical-optical, or other elements, all electronic elements, etc.) to generate data or report on actual, possible, or predictive failure events. This is by way of example only, the concept covers collecting and/or using or evaluating any data from failure detection elements, as implemented in various models of card-handling devices now or in the future.

In some embodiments, the server system 110 may be configured to at least partially control the operation of the gaming devices 102 by transmitting control data 612 to the gaming devices 102 via the gaming tables 104. The control data 612 may automatically cause the gaming device 102 to reconfigure and/or to perform one or more tasks. For example, if a gaming device 102 is identified as potentially malfunctioning based on the data received by the server system 110, the server system 110 may transmit control data 612 to cause the gaming device 102 to shut down and/or perform a diagnostic operation to identify a cause of the malfunction. In some embodiments, the gaming device 102 is configured to apply the control data 612 in response to associating with the gaming table 104. Otherwise, the gaming device 102 may ignore the control data 612. In other embodiments, the gaming device 102 may apply at least some control data 612 (e.g., diagnostics functions, shut down functions etc.) irrespective of the gaming device 102 associating with the gaming table 104.

In certain embodiments, the system 100 may further include user transceivers 118 for tracking the location of users within the gaming environments 101, such as employees and/or players. Each user transceiver 118 may be substantially similar to the device transceivers 206 shown in FIG. 2, though, in some embodiments, the user transceiver 118 may be different from the device transceivers. For example, the device transceiver 206 may be integrated with the device controller 202 (shown in FIG. 2), whereas the user transceiver may be a standalone apparatus. The user transceiver 118 is affixed to, coupled to, or held by a user 119 or the garments of the user 119.

The user transceiver 118 is configured to be incorporated within the method 400 (shown in FIG. 4) to determine the location of the user 119 similar to the determining the location of the gaming devices 102. For example, the user transceiver 118 communicates with the gaming tables 104 via the first communication network 106 to determine a relative distance between the user 119 and each gaming table 104. Based on the determined relative distances, the user transceiver generates location data indicating a relative location of the user. The location data is then transmitted to the server system 110 for storage with location data of other users and analysis. In certain embodiments, if the user 119 is an employee of the gaming environment, the user transceiver 118 may be configured to identify a role or position of the user 119. For example, if the user 119 is a card dealer, the user transceiver 118 may transmit identification data indicating the user 119 is a card dealer to the gaming tables 104. In some embodiments, the user transceiver 118 may be configured to collect and generate other suitable data, such as performance data, time spent at a particular gaming table 104, and the like.

Embodiments will vary as to what and where data collection, reporting, and analysis are done. In some embodiments, a gaming device may be fairly simple and relatively inexpensive, and its data collection and reporting capabilities will reflect these limitations. In one embodiment, such a gaming device will do no data analysis at all; it will all be done at a server location (or other computer that eventually receives or has access to the data). At the other end of the spectrum may be multi-functional gaming devices having the ability to perform multiple game functions as well as support multiple games, and further having their own displays, printers, and other components. Such sophisticated gaming devices may do some analysis of the data collected that enables them to generate, locally in a manner readable by humans. This may include output to a printer or on a screen. This enables a casino or other user of the device to track their usage, current amount owed, possible servicing requirements, and other parameters.

It is expected that the most sophisticated data analysis regarding predictive failure analysis will be done centrally, at least in part because more sophisticated analysis uses data from many gaming devices. However, some or all of the results of such analysis may be downloaded to any individual gaming devices that are sophisticated enough to use them, typically in the form of what the gaming device may detect in terms of patterns in its own data. Examples of such patterns may include the occurrence of certain logged events during a specified time period from a component, or, certain data entries, measurements, interrupts, or logs from a set of components that by themselves do not raise an alarm, but do raise an alarm when they occur together, etc. Any and all patterns determined by data analysis are conceptually included herein.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method for monitoring the locations in connection with stationary gaming tables in a gaming environment, the method comprising:
receiving, by a user transceiver associated with a user, data signals including identification data via a first communication network from a plurality of respective table transceivers of a plurality of stationary gaming tables;
determining, by one or more processors, an identity of each gaming table of the plurality of stationary gaming tables based on the identification data extracted from the data signal received from the respective table transceiver;
calculating, by the one or more processors, a relative distance between the user and each gaming table of the plurality of stationary gaming tables based on at least one characteristic of the respective data signal received from the respective table transceiver;
generating, by the one or more processors, location data indicating a relative location of the user at least partially as a function of the calculated relative distances associated with the user and the plurality of stationary gaming tables; and
transmitting, by at least one of the table transceivers, the location data to a communication node over a second communication network different from the first communication network, wherein the communication node is communicatively coupled to a server configured to store the location data and predetermined locations of the plurality of stationary gaming tables.

2. The method of claim 1 wherein the first communication network is an ultra-wideband communication network.

3. The method of claim 2, wherein the relative distances are calculated at least partially as a function of a time-of-flight characteristic of the data signal received or transmitted by each table transceiver.

4. The method of claim 1 further comprising determining, by the one or more processors, that the user is linked to a first gaming table of the plurality of stationary gaming tables for play of a game based on the location data.

5. The method of claim 1 further comprising generating, by the one or more processors, a dynamic map of the gaming environment that tracks the location of the plurality of stationary gaming tables and the user, the dynamic map updated based on the collected location data.

6. The method of claim 5 further comprising determining, by the one or more processors, a position of the user at the first gaming table based at least in part on the collected location data.

7. The method of claim 1, wherein the plurality of respective table transceivers includes at least one of the one or more processors.

8. A system comprising:
a plurality of table transceivers, each table transceiver of the plurality of table transceivers associated with a corresponding stationary gaming table and corresponding memory and in communication with a first communication network and a second communication network different from the first communication network, wherein the plurality of table transceivers is configured to communicatively couple to a user transceiver coupled to a user, the table transceivers configured to transmit and receive data signals including identification data via the first communication network with the user transceiver;
one or more processors, individually or in combination, being configured to:
calculate a relative distance between the user and one or more stationary gaming tables associated with the plurality of table transceivers based on at least one characteristic of a respective data signal received or transmitted by the table transceivers associated with the one or more stationary gaming tables; and
generate location data indicating a location of the user relative to the one or more stationary gaming tables at least partially as a function of the calculated relative distances associated with the user and the one or more stationary gaming tables;
a communication node in communication with the second communication network, the communication node configured to collect the generated location data from at least one table transceiver of the plurality of table transceivers over the second communication network; and
a server with associated memory, the server communicatively coupled to the communication node and configured to receive and store the collected location data.

9. The system of claim 8, wherein the first communication network is an ultra-wideband network.

10. The system of claim 9, wherein the relative distance is calculated at least partially as a function of a time-of-flight characteristic of the data signal received or transmitted between the user transceiver and a respective table transceiver of the plurality of table transceivers.

11. The system of claim 8, wherein the one or more processors, individually or in combination, are further configured to:
identify a first gaming table associated with the user based at least partially on the calculated relative distance between the first gaming table of the one or more stationary gaming tables and the user; and
link the first gaming table to the user for play of a game.

12. The system of claim 11, wherein the plurality of table transceivers includes at least one of the one or more processors.

13. The system of claim 11, wherein the identification data of the user transceiver includes the role of the user, and wherein the user is associated with the first gaming table based on the role, the role selected from a group comprising a player, a dealer, or an employee.

14. The system of claim 8, wherein the server is configured to generate a dynamic map of the gaming environment that tracks the location of the plurality of stationary gaming tables and the user, the dynamic map updated based on the collected location data.

* * * * *